United States Patent
Jeung et al.

(10) Patent No.: US 10,483,505 B2
(45) Date of Patent: Nov. 19, 2019

(54) SHEET ATTACHMENT DEVICE FOR BATTERY PACKS

(71) Applicant: LG CHEM, LTD., Seoul (KR)

(72) Inventors: Seok Won Jeung, Daejeon (KR); Ju Hwan Baek, Daejeon (KR); Choon Kwon Kang, Daejeon (KR); Sung Choon Choo, Daejeon (KR); Hyeong Min Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 115 days.

(21) Appl. No.: 15/559,932

(22) PCT Filed: Jun. 9, 2016

(86) PCT No.: PCT/KR2016/006121
§ 371 (c)(1),
(2) Date: Sep. 20, 2017

(87) PCT Pub. No.: WO2016/200173
PCT Pub. Date: Dec. 15, 2016

(65) Prior Publication Data
US 2018/0097210 A1   Apr. 5, 2018

(30) Foreign Application Priority Data
Jun. 10, 2015   (KR) .................. 10-2015-0081621

(51) Int. Cl.
*H01M 2/10*   (2006.01)
*H01M 2/02*   (2006.01)
(Continued)

(52) U.S. Cl.
CPC .......... *H01M 2/10* (2013.01); *H01M 2/0267* (2013.01); *H01M 2/1061* (2013.01);
(Continued)

(58) Field of Classification Search
None
See application file for complete search history.

(56) References Cited

U.S. PATENT DOCUMENTS

| | | |
|---|---|---|
| 2013/0034752 A1 | 2/2013 | Choi et al. |
| 2014/0141289 A1 | 5/2014 | Choi et al. |

FOREIGN PATENT DOCUMENTS

| | | |
|---|---|---|
| CN | 1292340 A | 4/2001 |
| CN | 2753678 Y | 1/2006 |

(Continued)

OTHER PUBLICATIONS

English translation of Woo KR 10-0766428 obtained via Google Patents on Apr. 10, 2019 (Year: 2007).*

(Continued)

*Primary Examiner* — Sarah A. Slifka
(74) *Attorney, Agent, or Firm* — Birch, Stewart, Kolasch & Birch, LLP

(57) ABSTRACT

Disclosed herein is a sheet attachment device for battery packs, specifically a sheet attachment device for attaching a label sheet and a sheathing sheet to a battery pack having a plate-shaped battery cell mounted in a pack case. The sheet attachment device includes first and second loaders, first and second jigs, first and second guide frames, a first sheet attachment jig, a rotator, a pressing roller, a conveyor, and a second sheet attachment jig.

24 Claims, 6 Drawing Sheets

(51) Int. Cl.
*H01M 2/34* (2006.01)
*H01M 10/04* (2006.01)

(52) U.S. Cl.
CPC ....... *H01M 2/344* (2013.01); *H01M 10/0404* (2013.01); *H01M 2220/30* (2013.01)

(56) References Cited

FOREIGN PATENT DOCUMENTS

| | | | |
|---|---|---|---|
| CN | 102530335 A | 7/2012 |
| CN | 104417804 A | 3/2015 |
| JP | 2001-58618 A | 3/2001 |
| JP | 2002-25514 A | 1/2002 |
| JP | 2002-37227 A | 2/2002 |
| JP | 2007-48723 A | 2/2007 |
| JP | 2009-187785 A | 8/2009 |
| JP | 2013-38065 A | 2/2013 |
| KR | 10-2001-0039913 A | 5/2001 |
| KR | 10-2003-0088755 A | 11/2003 |
| KR | 10-0446124 B1 | 8/2004 |
| KR | 10-2005-0121114 A | 12/2005 |
| KR | 10-2007-0006092 A | 1/2007 |
| KR | 10-0766428 B1 | 10/2007 |
| KR | 10-2013-0018577 A | 2/2013 |
| KR | 10-1481450 B1 | 1/2015 |
| KR | 10-2015-0050115 A | 5/2015 |

OTHER PUBLICATIONS

English translation of Tanaka et al KR 2001-0039913 obtained via Google Patents on Apr. 10, 2019 (Year: 2001).*
International Search Report for PCT/KR2016/006121 (PCT/ISA/210) dated Sep. 13, 2016.

* cited by examiner

[FIG. 1]
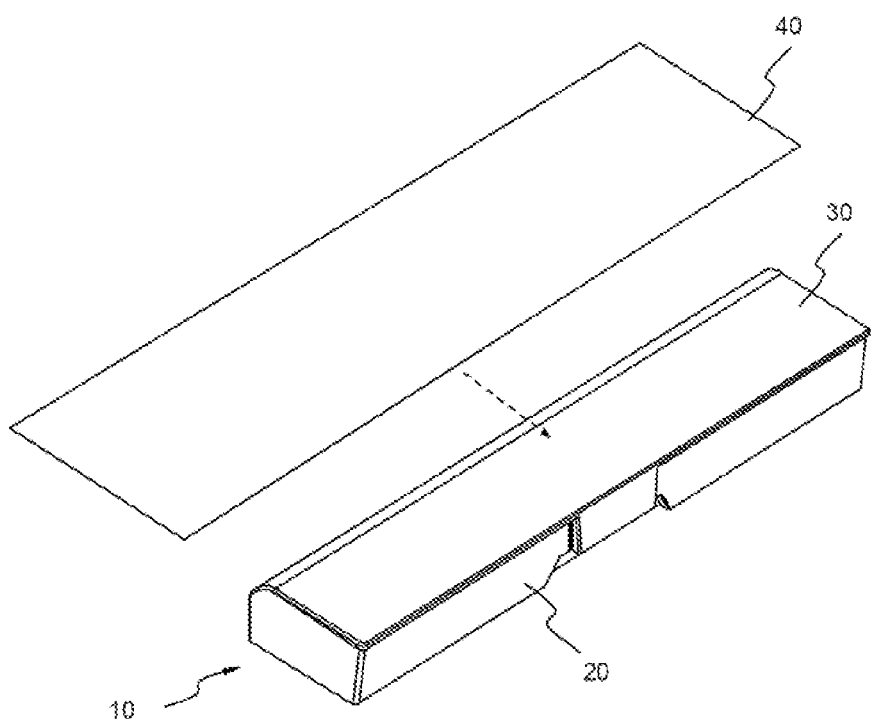

[FIG. 2]
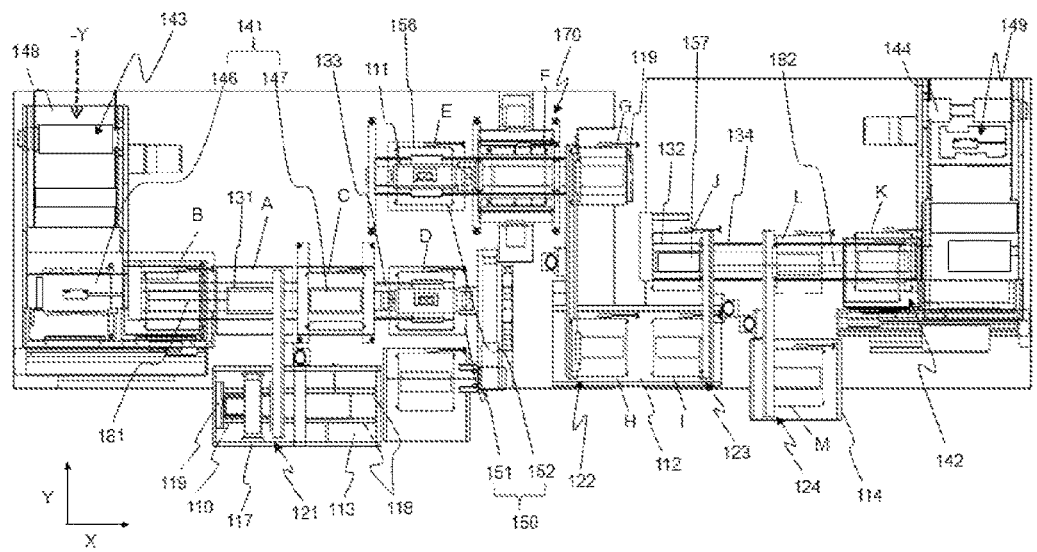
[FIG. 3]
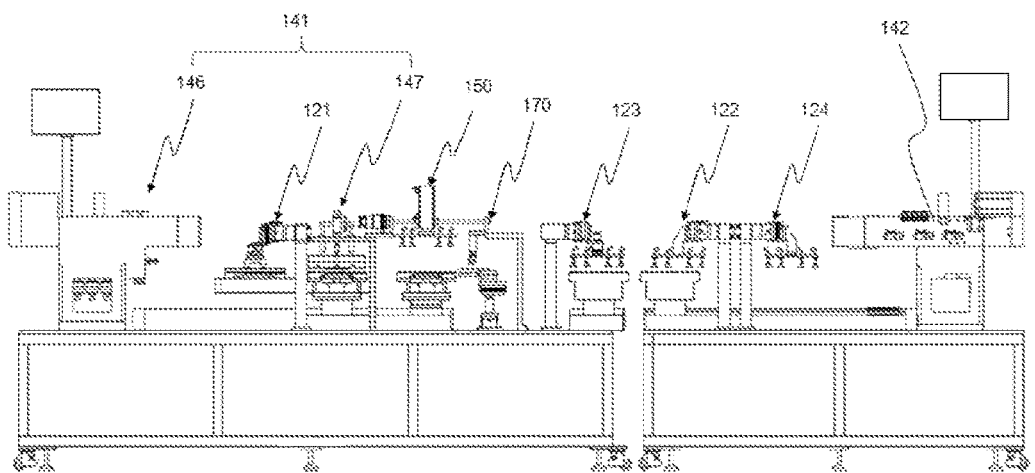

[FIG. 4]
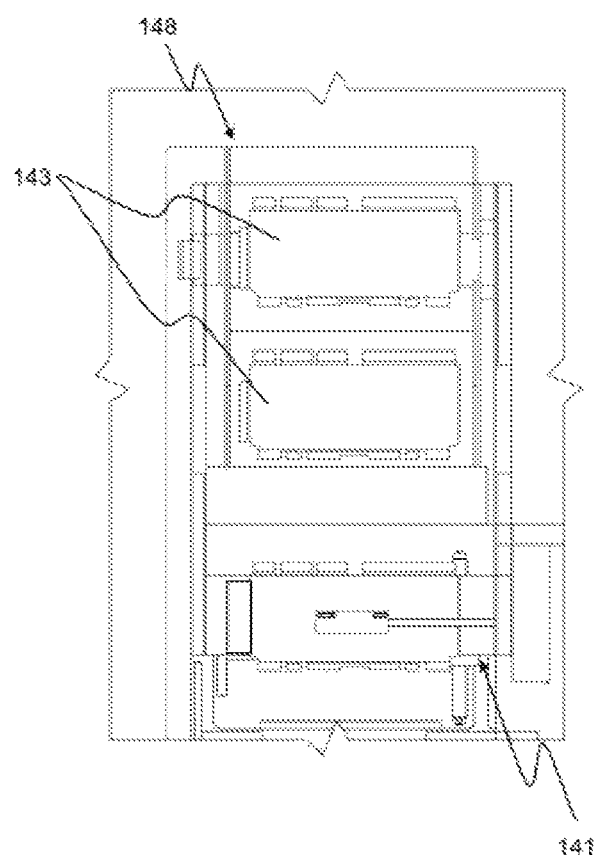

[FIG. 5]
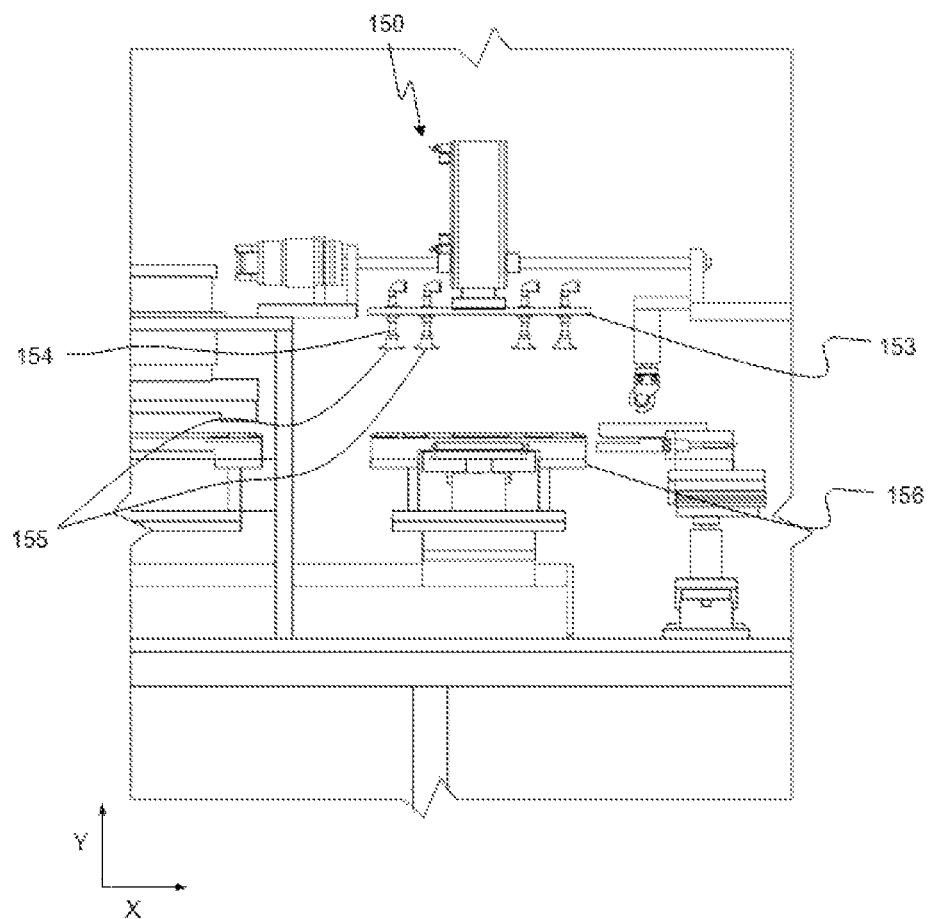

[FIG. 6]
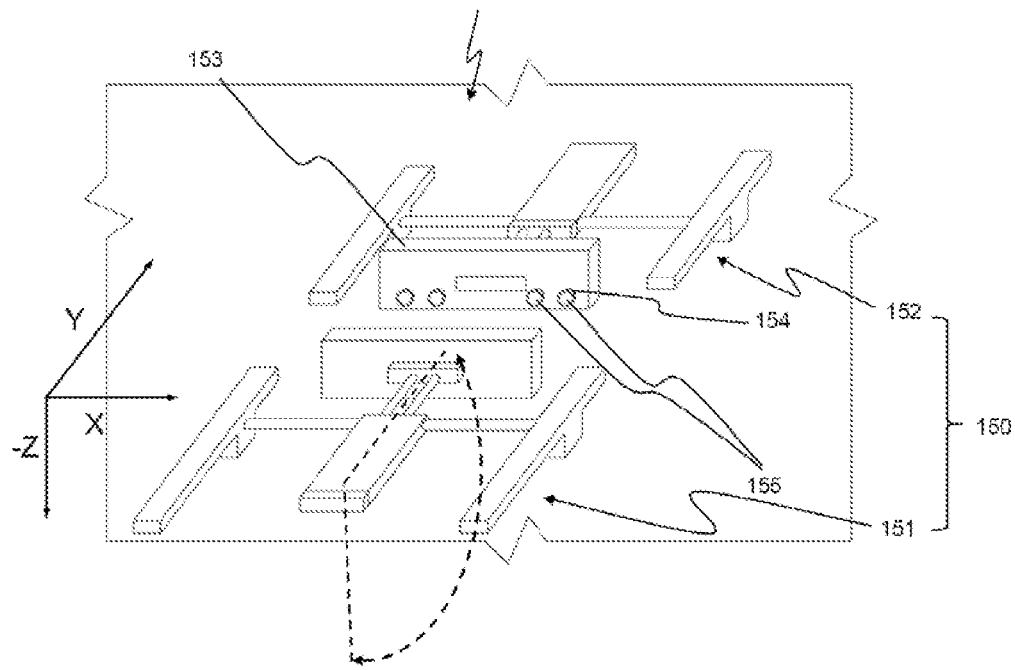
[FIG. 7]
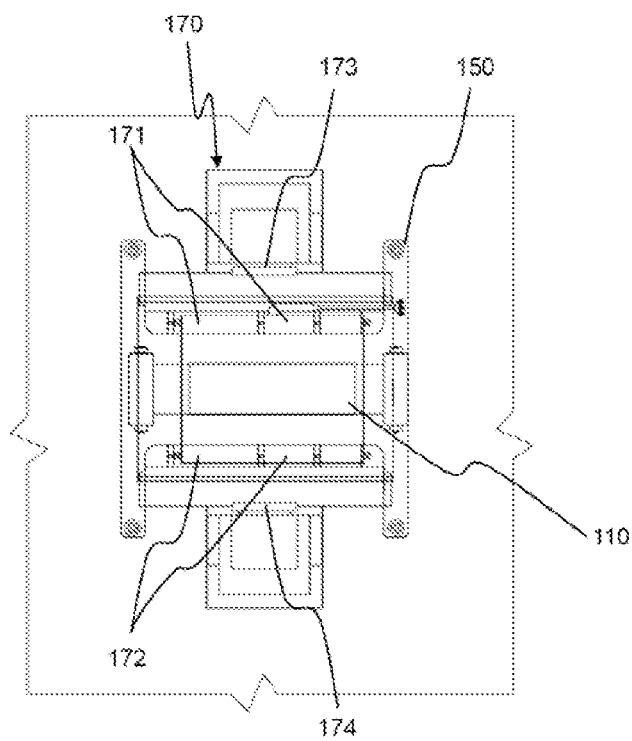

[FIG. 8]
200
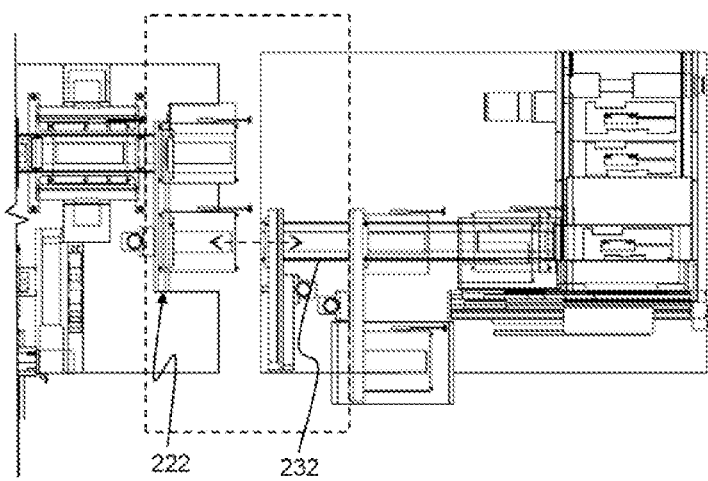
[FIG. 9]
300
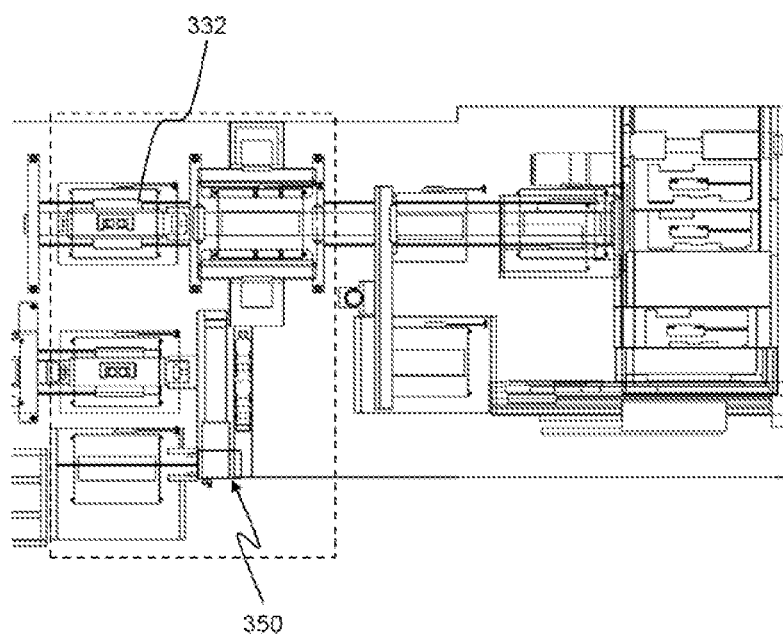

SHEET ATTACHMENT DEVICE FOR BATTERY PACKS

CROSS-REFERENCE TO RELATED APPLICATIONS

This application claims the benefit of Korean Patent Application No. 2015-0081621 filed on Jun. 10, 2015 with the Korean Intellectual Property Office, the disclosure of which is herein incorporated by reference in its entirety.

TECHNICAL FIELD

The present invention relates to a sheet attachment device for battery packs.

BACKGROUND ART

In recent years, secondary batteries, which can be charged and discharged, have been widely used as an energy source for wireless mobile devices. In addition, secondary batteries have attracted considerable attention as an energy source for electric vehicles and hybrid electric vehicles, which have been developed to solve problems, such as air pollution, caused by existing gasoline and diesel vehicles using fossil fuel. Therefore, secondary batteries are being applied to an increasing number of applications owing to advantages thereof and, in the future, secondary batteries are expected to be applied to even more applications and products.

Based on the construction of electrodes and an electrolytic solution, secondary batteries may be classified into a lithium ion battery, a lithium ion polymer battery, and a lithium polymer battery. In particular, the lithium ion polymer battery has been increasingly used because the lithium ion polymer battery has a low possibility of leakage of an electrolytic solution and can be easily manufactured.

Based on the shape of a battery case, secondary batteries may also be classified into a cylindrical battery having an electrode assembly mounted in a cylindrical metal container, a prismatic battery having an electrode assembly mounted in a prismatic metal container, and a pouch-shaped battery having an electrode assembly mounted in a pouch-shaped case made of an aluminum laminate sheet.

The greatest advantage of a wireless device, such as a laptop computer, is portability, and a secondary battery plays one of the greatest roles in improving the portability of such a wireless device.

The secondary battery is widely used as an energy source for diverse electronic products as well as various kinds of mobile devices. However, various kinds of combustible materials are contained in the secondary battery. As a result, the lithium secondary battery may overheat or explode due to overcharge of the secondary battery, overcurrent in the secondary battery, or external physical impact applied to the secondary battery. In order to solve the above problems, safety elements, such as a positive temperature coefficient (PTC) element and a protection circuit module (PCM), which are capable of effectively controlling an abnormal state of the secondary battery, such as overcharge of the secondary battery or overcurrent in the secondary battery, are connected to a battery cell of the secondary battery.

A battery pack having parts, such as the safety elements and PCM module, loaded in a battery case is manufactured through a somewhat complicated process in which an electrode assembly is mounted in the battery case, an electrolytic solution is injected into the battery case, and the battery case is sealed. A label indicating the specification of the battery pack is attached to the outside of the case.

FIG. 1 is a schematic view showing a conventional battery pack for laptop computers.

Referring to FIG. 1, a battery pack 10 is configured to have a structure in which a battery module including a plurality of batteries connected to each other in series and in parallel is mounted in a pack case 20, the pack case 20 is covered by a cover 30, and a sheet, such as a label sheet 40 indicating the specification of the battery pack, is attached to the outside of the pack case 20.

In the case in which a label sheet is attached to a sheathing case of a secondary battery manually or using a labeling device according to the conventional art, however, jigs or devices for loading the jigs must be exchanged depending on the size of the battery case, whereby productivity is reduced.

In addition, in the case in which a bent portion, a concave portion, or a convex portion is formed at the battery case, a portion of the label sheet or the sheathing sheet is not tightly attached to the battery case. As a result, air bubbles may be formed between the battery case and the label sheet, or the label sheet may be folded, whereby the battery case does not have an aesthetically pleasing appearance.

DISCLOSURE

Technical Problem

Therefore, the present invention has been made to solve the above problems and other technical problems that have yet to be resolved.

Specifically, it is an object of the present invention to provide a sheet attachment device for loading a battery pack having a plate-shaped battery cell mounted in a pack case on a transfer jig using a loader and transferring the battery pack to a sheet attachment jig in order to attach a label sheet and a sheathing sheet to the battery pack and a battery pack manufactured using the sheet attachment device.

Technical Solution

In accordance with one aspect of the present invention, the above and other objects can be accomplished by the provision of a sheet attachment device for attaching a label sheet and a sheathing sheet to a battery pack having a plate-shaped battery cell mounted in a pack case, the sheet attachment device including first and second loaders for moving the battery pack in the direction perpendicular to the ground and in the direction parallel to the ground in order to attach the label sheet and the sheathing sheet to the battery pack, first and second jigs for fixing the battery pack moved by the first and second loaders, first and second guide frames connected to the first and second jigs via sub robots for guiding the first and second jigs to process positions, a first sheet attachment jig for attaching the label sheet to one surface of the battery pack loaded on the first jig, a rotator for rotating the battery pack having the label sheet attached to the one surface thereof 180 degrees upward and downward, a pressing roller for pressing an unattached portion of the label sheet that has not been attached to the battery pack to the outer surface of the battery pack in order to attach the label sheet to the battery pack, a conveyor for conveying the battery pack having the label sheet attached thereto, which is transferred from the first and second loaders, and a second sheet attachment jig for attaching the sheathing sheet to the opposite surface of the battery pack having the label sheet attached thereto, which is loaded on the second jig.

That is, the sheet attachment device for battery packs according to the present invention is a linear type device that is capable of automatically attaching a roll type label sheet to the sheathing case of the battery pack, with the result that tact time is reduced to 6 seconds or less, thereby reducing manufacturing time and manufacturing cost, that is capable of attaching the label sheet to a consistent position, thereby minimizing attachment errors, and that is capable of preventing air bubbles from being formed between the battery case and the label sheet and preventing the label sheet from being folded, thereby improving productivity.

In a concrete example, the battery cell may be a prismatic battery cell having an electrode assembly mounted in a prismatic battery case.

According to the present invention, the first loader may supply the battery pack to the first jig in order to attach the label sheet to the one surface of the battery pack, and the second loader may supply the battery pack having the label sheet attached thereto to the second jig in order to attach the sheathing sheet to the opposite surface of the battery pack.

Each of the loaders may include a sensor for sensing the direction in which the battery pack is moved and the size of the battery pack.

In a concrete example, the sheet attachment device may further include a third loader for rotating the battery pack based on the direction perpendicular to the ground and a fourth loader for discharging the battery pack having the sheathing sheet attached thereto to a discharge port.

In the above structure, the battery pack, which has been transferred from the third loader in the state of being rotated 180 degrees horizontally, may be supplied to the fourth loader along the conveyor.

According to the present invention, metal guide lines may be arranged on the conveyor at intervals corresponding to the size of the battery pack.

In an example, the conveyor may be provided at the sides thereof with side bars for fixing the metal guide lines in order to prevent the battery pack from being separated from the conveyor.

In addition, each of the first and second jigs may be provided at one surface thereof with a recessed step for preventing the battery pack from being separated from the first and second jigs during the movement of the battery pack.

In this case, each of the first sheet attachment jig and the second sheet attachment jig may be a linear type attachment unit.

The rotator may include a transmitter unit and a receiver unit, each of the transmitter unit and the receiver unit may include a fixing part having a size corresponding to the size of the battery pack and a suction part for suctioning the battery pack, and the transmitter unit and the receiver unit may be rotatable such that the fixing part of the transmitter unit and the fixing part of the receiver unit face each other.

In this case, the suction part may be provided with at least one suction pad configured to contact the battery pack.

According to the present invention, the pressing roller may include first and second rollers located at opposite sides of the battery pack, and the first and second rollers may attach the portion of the label sheet that has not been attached to the battery pack to a portion of the outer surface of the battery pack while moving to the middle region of the battery pack.

In the above structure, the pressing roller may further include roller pressing parts configured to move to the middle region of the battery pack from the opposite sides of the battery pack.

In a concrete example, the first and second rollers may be configured to be individually rotatable.

In this case, the first and second rollers may attach the label sheet in a divided attachment fashion.

According to the present invention, the first sheet attachment jig may include a first pressing part for attaching the label sheet to the one surface of the battery pack based on the ground and a second pressing part located at one side of the first pressing part for pressing the outer edge of the battery pack from the one surface of the battery pack.

In a concrete example, the second pressing part may simultaneously attach the label sheet to four side surfaces of the battery pack.

In addition, the first sheet attachment jig may further include a label sheet supply part disposed in a direction opposite the first jig, at which the label sheet is mounted.

In a concrete example, the label sheet supply part may include a sensor for sensing the position of a guide hole formed in the label sheet in order to maintain the direction in which the label sheet is supplied.

In addition, the label sheet supply part may be configured to have a structure that is capable of supplying the label sheet in the direction in which the label sheet is not torn when the label sheet is removed.

According to the present invention, the second sheet attachment jig may include a sheathing sheet supply part disposed in the direction opposite the second jig on which the battery pack is loaded.

In the above structure, when the first and second jigs, on which the battery pack is loaded, are moved and located at consistent positions, the first sheet attachment jig or the second sheet attachment jig may be moved downward toward the battery pack in order to attach the label sheet or the sheathing sheet to the battery pack.

In a concrete example, the sheet attachment device may further include a battery pack supply conveyor for supplying the battery pack and a battery pack discharge conveyor for discharging the battery pack having the label sheet and the sheathing sheet attached thereto.

In this case, a stopper for stopping the movement of the battery pack may be mounted to one end of the battery pack supply conveyor.

In a concrete example, the sheet attachment device may further include a touch screen for control.

In accordance with another aspect of the present invention, there is provided a battery pack manufacturing method of attaching a label sheet and a sheathing sheet to a battery pack using the sheet attachment device.

In accordance with a further aspect of the present invention, there is provided a battery pack for laptop computers manufactured using the method.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a schematic view showing a conventional secondary battery pack;

FIG. 2 is a plan schematic view showing a sheet attachment device for battery packs according to an embodiment of the present invention;

FIG. 3 is a front schematic view showing the sheet attachment device for battery packs according to the embodiment of the present invention;

FIG. 4 is a partial schematic view of the sheet attachment device shown in FIGS. 2 and 3;

FIG. 5 is a perspective view of a rotator shown in FIGS. 2 and 3;

FIG. 6 is a front schematic view of the rotator shown in FIGS. 2 and 3;

FIG. 7 is a partially enlarged schematic view of a pressing roller shown in FIGS. 2 and 3;

FIG. 8 is a partial schematic view showing a sheet attachment device for battery packs according to another embodiment of the present invention; and FIG. 9 is a partial schematic view showing a sheet attachment device for battery packs according to a further embodiment of the present invention.

BEST MODE

Now, exemplary embodiments of the present invention will be described in detail with reference to the accompanying drawings. It should be noted, however, that the scope of the present invention is not limited by the illustrated embodiments.

FIGS. 2 and 3 are a plan schematic view and a front schematic view showing a sheet attachment device for battery packs according to an embodiment of the present invention, respectively.

Referring to FIGS. 2 and 3, a sheet attachment device 100 includes first and second loaders 121 and 122 for moving a battery pack 110, first and second jigs 131 and 132 for fixing the battery pack 110, first and second guide frames 133 and 134 for transferring the battery pack, a first sheet attachment jig 141, a rotator 150 for rotating the battery pack 180 degrees upward and downward, a pressing roller 170 for pressing and attaching a label sheet to the outer surface of the battery pack, a conveyor 111 for conveying the battery pack, and a second sheet attachment jig 142 for attaching a sheathing sheet 144 to the battery pack.

The sheet attachment device 100 performs individual processes in the state in which the battery pack 100 is located at positions A to M (in alphabetical order).

In order to attach the label sheet 143 and the sheathing sheet 144 to the battery pack 110, the first and second loaders 121 and 122 move the battery pack 110 in the direction perpendicular to the ground and horizontally move the battery pack 110 to the first and second jigs 131 and 132 for fixing the battery pack 110 such that the battery pack 110 is loaded on the first and second jigs 131 and 132.

The first loader 121 supplies the battery pack 110 to the first jig 131 in order to attach the label sheet 143 to one surface of the battery pack 110. The second loader 122 supplies the battery pack 110 to the second jig 132 in order to attach the sheathing sheet 144 to the opposite surface of the battery pack 110.

The sheet attachment device 100 further includes a third loader 123 for rotating the battery pack based on the direction perpendicular to the ground and a fourth loader 124 for discharging the battery pack to a discharge port after the sheathing sheet is attached to the battery pack. The battery pack 110, which has been transferred from the third loader 123 in the state of being rotated 180 degrees horizontally, is supplied to the fourth loader 124 along the conveyor.

The sheet attachment device 100 further includes a battery pack supply conveyor 113 for supplying the battery pack 110 and a battery pack discharge conveyor 114 for discharging the battery pack having the label sheet 143 and the sheathing sheet 114 attached thereto.

A stopper 119 for stopping the movement of the battery pack 110 is mounted to the end of the battery pack supply conveyor 113. The first loader 121, the second loader 122, the third loader 123, and the fourth loader 124 supply battery packs 110, stopped by the stoppers 119 at the ends of the conveyors 111, 112, and 113, to subsequent processes.

The first and second guide frames 133 and 134 are connected to the first and second jigs 131 and 132 via sub robots 181 and 182 in order to guide the first and second jigs 131 and 132 to process positions. The first and second guide frames 133 and 134 may be automated by adopting frame structures for guiding the first and second jigs 131 and 132 to the respective processes.

The conveyors 111, 112, and 113 are configured to supply the battery packs 110 to the first loader 121, the second loader 122, and the third loader 123 while being rotated at a low speed. On the conveyors 111, 112, 113, and 114 are provided metal guide lines 118, which are arranged at intervals corresponding to the size of the battery pack 110 in the direction in which the conveyors 111, 112, 113, and 114 are rotated.

The conveyors 111, 112, 113, and 114 are provided at the sides thereof with side bars 117 for fixing the metal guide lines 118. The battery pack 110 is moved on the conveyors 111, 112, 113, and 114.

The first and second jigs 131 and 132 fix the battery pack 110 that is moved by the first and second loaders 121 and 122. The first and second jigs 131 and 132 are provided on the upper surfaces thereof with recessed steps (not shown) for preventing the battery pack from being separated from the first and second jigs during the movement of the battery pack.

The first sheet attachment jig 141, which is a linear type attachment unit, attaches the label sheet 143 to one surface of the battery pack 110 loaded on the first jig 131.

The first sheet attachment jig 141 includes a first pressing part 146 for attaching the label sheet 143 to the upper surface of the battery pack 110 loaded on the first jig 131 and a second pressing part 147 located at one side of the first pressing part 146 for pressing the outer edge of the battery pack 110 from the one surface of the battery pack 110.

Specifically, when the first jig 131, on which the battery pack 110 is loaded, is moved and located at the consistent position of the first pressing part 146, at which the label sheet 143 is attached to the battery pack, the first pressing part 146 is moved downward toward the battery pack 110 in order to attach the label sheet 143 to the upper surface of the battery pack 110.

The battery pack 110 having the label sheet 143 attached to the upper surface thereof is moved in the state of being loaded on the first jig 131. When the upper surface of the battery pack 110 is located at the consistent position of the second pressing part 147, the second pressing part 147 is moved downward toward the battery pack 110 in order to simultaneously attach the label sheet 143 to the four side surfaces of the battery pack 110.

That is, when the first jig is sequentially moved from the first pressing part 146 to the second pressing part 147, the label is sequentially attached to the upper surface and the four side surfaces of the battery pack 110.

The sides of the first sheet attachment jig 141 have different sizes such that the first sheet attachment jig 141 can be used in all battery packs even when the sizes of the battery packs are changed. In addition, the wire of the battery pack is aligned so as not to disturb the attachment of the label sheet to the battery pack.

The second sheet attachment jig 142 attaches the sheathing sheet 144 to the opposite surface of the battery pack having the label sheet attached thereto, which is loaded on the second jig 132. The first sheet attachment jig 141 attaches the label sheet 143 to the battery pack, whereas the second sheet attachment jig 142 attaches the sheathing sheet 144 to the battery pack.

The first sheet attachment jig 141 includes a label sheet supply part 148 disposed in the direction opposite the first jig 131, and the second sheet attachment jig 142 includes a sheathing sheet supply part 149 disposed in the direction opposite the second jig 132.

The rotator 150 rotates the battery pack having the label sheet 143 attached to the upper surface thereof 180 degrees upward and downward. The rotator 150 includes a pair including transmitter unit 151 (see FIG. 6) and a receiver unit 152 (see FIG. 6). The rotator 150 rotates the surface of the battery pack to which the label sheet 143 is attached 180 degrees.

The sheet attachment device 100 further includes an aligner 156. The aligner 156 is located in the negative Z-axis direction of the receiver unit 152 (see FIG. 6) of the rotator 140. The aligner 156 aligns the position of the battery pack 110 that has been rotated 180 degrees upward and downward and moves the battery pack 110 to the pressing roller 170.

When the battery pack 110 having the label sheet 143 attached thereto is rotated 180 degrees upward and downward by the rotator 150, the aligner 156 aligns the position of the battery pack 110. In this process, the aligner 156 applies pressure to the side surface of the battery pack 110. Consequently, the label sheet 143 is securely attached to the side surface of the battery pack 110. Subsequently, the battery pack 110 is moved to the pressing roller 1770.

The pressing roller 170 presses the unattached portion of the label sheet 143 that has not been attached to the battery pack to the outer surface of the battery pack in order to attach the label sheet to the battery pack. The pressing roller 170 includes first and second rollers 171 and 172 (see FIG. 7) located at opposite sides of the battery pack.

The first and second rollers 171 and 172 attach the portion of the label sheet 143 that has not been attached to the battery pack to the outer surface of the battery pack while moving to the middle region of the battery pack.

FIG. 4 is a schematic view of the sheet attachment device shown in FIGS. 2 and 3.

Referring to FIG. 4, the first sheet attachment jig 141 includes a label sheet supply part 148 disposed in the direction opposite the first jig 131 (see FIG. 2), at which the label sheet 143 is mounted. The label sheet 143 is supplied to the label sheet supply part 148 in the direction perpendicular to the direction in which the first jig is moved (i.e. in the negative Y-axis direction). After the label sheet is attached to the battery pack, the first sheet attachment jig 141 moves to the label sheet supply part 148 in order to attach the label sheet to the next battery pack. When the battery pack loaded on the first jig 131 (see FIG. 2) is transferred and stopped at the label sheet attachment position, the first sheet attachment jig 141 moves while holding the label sheet 143 in order to attach the label sheet to the battery pack.

FIGS. 5 and 6 are front schematic views of the rotator shown in FIGS. 2 and 3

Referring to FIGS. 5 and 6, the rotator 150 rotates the battery pack having the label sheet 143 attached thereto on the basis of a plane. The transmitter unit 151 and the receiver unit 152 may be rotatable 90 degrees such that fixing parts 153 of the transmitter unit 151 and the receiver unit 152 face each other.

Each of the transmitter unit 151 and the receiver unit 152 includes a fixing part 153 having a size corresponding to the size of the battery pack and a suction part 154 for suctioning the battery pack.

A suction pad 155 configured to contact the battery pack is mounted at one side of the suction part 154. The other side of the suction part 154 is connected to the fixing part 153. The rear surface of the suction part 154 is connected to an exhaust pipe (not shown) to suction the battery pack. In this structure, the surface of the battery pack to which the label sheet 143 is attached is rotated 180 degrees. That is, the fixing part 153 of the transmitter unit 151 suctions the battery pack in the negative Z-axis direction, rotates 90 degrees in the Y-axis direction, and moves in the direction indicated by the arrow.

FIG. 7 is a partially enlarged schematic view of the pressing roller shown in FIGS. 2 and 3.

Referring to FIG. 7, the pressing roller 170 includes first and second rollers 171 and 172, each of which includes a plurality of rollers. The first and second rollers 171 and 172 move to the middle region of the battery pack.

The pressing roller 170 is provided with roller pressing parts 173 and 174 configured to move to the middle region of the battery pack from the opposite sides of the battery pack.

The first and second rollers 171 and 172, each of which includes a plurality of rollers having different lengths, are individually rotated to tightly attach the label sheet to even a bent region, a concave region, or a convex region of the battery pack 110.

FIG. 8 is a partial schematic view showing a sheet attachment device for battery packs according to another embodiment of the present invention.

Referring to FIG. 8, a sheet attachment device 200 is configured to have a structure in which a second loader 222 transfers a battery pack to a second jig 232. The number of loaders in a dotted-line region is reduced. The structure of FIG. 8 is identical to that of FIG. 2 except that the number of loaders is reduced, and therefore a duplicate description thereof will be omitted.

FIG. 9 is a partial schematic view showing a sheet attachment device for battery packs according to a further embodiment of the present invention.

Referring to FIG. 9, a sheet attachment device 300 is configured to have a structure in which a rotator 350 transfers a battery pack to a second jig 332. The rotator 350 rotates a battery pack having a label sheet attached to one surface thereof to transfer the battery pack to the second jig 332 without using a loader. Since no loader is used between the rotator 350 and the second jig 332, space limitations are reduced, thereby improving productivity. The structure of FIG. 8 is identical to that of FIG. 2 except that no loader is used between the rotator 350 and the second jig 332, and therefore a duplicate description thereof will be omitted.

INDUSTRIAL APPLICABILITY

As is apparent from the above description, in the sheet attachment device for battery packs according to the present invention, the label sheet is attached to the outer case of the battery pack through automation, whereby it is possible to reduce manufacturing time and manufacturing cost. In addition, the label sheet is attached to a consistent position of the outer case, whereby it is possible to minimize attachment errors. Furthermore, it is possible to prevent air bubbles from being formed between the battery case and the label sheet and to prevent the label sheet from being folded, thereby improving productivity.

Moreover, the sheet attachment device for battery packs according to the present invention is configured as a linear type sheet attachment device. Consequently, it is possible to observe operating processes with the naked eye, thereby achieving easy repair and maintenance.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A sheet attachment device for attaching a label sheet and a sheathing sheet to a battery pack having a plate-shaped battery cell mounted in a pack case, the sheet attachment device comprising:
   a first loader for moving the battery pack in a direction perpendicular to a ground and in a direction parallel to the ground in order to attach the label sheet to the battery pack; and in
   a first jig for fixing the battery pack moved by the first loader;
   a first guide frame connected to the first jig via sub robots for guiding the first jig to a first process position;
   a first sheet attachment jig for attaching the label sheet to one surface of the battery pack loaded on the first jig;
   a rotator for rotating the battery pack having the label sheet attached to the one surface thereof 180 degrees upward and downward;
   a pressing roller for pressing an unattached portion of the label sheet that has not been attached to the battery pack to an outer surface of the battery pack in order to attach the label sheet to the battery pack;
   a second loader for moving the battery pack in a direction perpendicular to the ground and in a direction parallel to the ground in order to attach the sheathing sheet to the battery pack, the second loader receiving the battery pack from the pressing roller;
   a first conveyor for conveying the battery pack having the label sheet attached thereto, which is transferred from the second loader;
   a second jig for fixing the battery pack moved by the second loader;
   a second guide frame connected to the second jig via sub robots for guiding the second jig to a second process position; and
   a second sheet attachment jig for attaching the sheathing sheet to an opposite surface of the battery pack having the label sheet attached thereto, which is loaded on the second jig.

2. The sheet attachment device according to claim 1, wherein the battery cell is a prismatic battery cell having an electrode assembly mounted in a prismatic battery case.

3. The sheet attachment device according to claim 1, wherein the first loader supplies the battery pack to the first jig in order to attach the label sheet to the one surface of the battery pack, and
   wherein the second loader supplies the battery pack having the label sheet attached thereto to the second jig in order to attach the sheathing sheet to the opposite surface of the battery pack.

4. The sheet attachment device according to claim 3, further comprising a third loader for rotating the battery pack based on the direction perpendicular to the ground and a fourth loader for discharging the battery pack having the sheathing sheet attached thereto to a discharge port.

5. The sheet attachment device according to claim 4, wherein the battery pack, which has been transferred from the third loader in a state of being rotated 180 degrees horizontally, is supplied to the fourth loader along a second conveyor.

6. The sheet attachment device according to claim 1, wherein metal guide lines are arranged on the first conveyor at intervals corresponding to a size of the battery pack.

7. The sheet attachment device according to claim 6, wherein the first conveyor is provided at sides thereof with side bars for fixing the metal guide lines in order to prevent the battery pack from being separated from the first conveyor.

8. The sheet attachment device according to claim 1, wherein each of the first and second jigs is provided at one surface thereof with a recessed step for preventing the battery pack from being separated from the first and second jigs during the movement of the battery pack.

9. The sheet attachment device according to claim 1, wherein each of the first sheet attachment jig and the second sheet attachment jig is a linear type attachment unit.

10. The sheet attachment device according to claim 1, wherein the rotator comprises a transmitter unit and a receiver unit,
    wherein each of the transmitter unit and the receiver unit comprises a fixing part having a size corresponding to a size of the battery pack and a suction part for suctioning the battery pack, and
    wherein the transmitter unit and the receiver unit are rotatable such that the fixing part of the transmitter unit and the fixing part of the receiver unit face each other.

11. The sheet attachment device according to claim 10, wherein the suction part is provided with at least one suction pad configured to contact the battery pack.

12. The sheet attachment device according to claim 1, wherein the pressing roller comprises first and second rollers located at opposite sides of the battery pack, and
    wherein the first and second rollers attach a portion of the label sheet that has not been attached to the battery pack to a portion of the outer surface of the battery pack while moving to a middle region of the battery pack.

13. The sheet attachment device according to claim 12, wherein the pressing roller further comprises roller pressing parts configured to move to the middle region of the battery pack from the opposite sides of the battery pack.

14. The sheet attachment device according to claim 12, wherein the first and second rollers are configured to be individually rotatable.

15. The sheet attachment device according to claim 1, wherein the first sheet attachment jig comprises a first pressing part for attaching the label sheet to the one surface of the battery pack based on the ground and a second pressing part located at one side of the first pressing part for pressing an outer edge of the battery pack from the one surface of the battery pack.

16. The sheet attachment device according to claim 15, wherein the second pressing part simultaneously attaches the label sheet to at least four side surfaces of the battery pack.

17. The sheet attachment device according to claim 1, wherein the first sheet attachment jig comprises a label sheet supply part disposed in a direction opposite the first jig, at which the label sheet is mounted.

18. The sheet attachment device according to claim 17, wherein the label sheet supply part comprises a sensor for sensing a position of a guide hole formed in the label sheet in order to maintain a direction in which the label sheet is supplied.

19. The sheet attachment device according to claim 1, wherein the second sheet attachment jig comprises a sheathing sheet supply part disposed in a direction opposite the second jig on which the battery pack is loaded.

20. The sheet attachment device according to claim 1, wherein, when the first and second jigs, on which the battery pack is loaded, are moved and located at consistent positions, the first sheet attachment jig or the second sheet attachment jig is moved downward toward the battery pack in order to attach the label sheet or the sheathing sheet to the battery pack.

21. The sheet attachment device according to claim 1, further comprising a battery pack supply conveyor for supplying the battery pack and a battery pack discharge conveyor for discharging the battery pack having the label sheet and the sheathing sheet attached thereto.

22. The sheet attachment device according to claim 21, wherein a stopper for stopping the movement of the battery pack is mounted to one end of the battery pack supply conveyor.

23. A battery pack manufacturing method of attaching a label sheet and a sheathing sheet to a battery pack using the sheet attachment device according to claim 1.

24. A battery pack for laptop computers manufactured using the method according to claim 23.

\* \* \* \* \*